Nov. 21, 1944.   R. T. PARKER   2,363,353

CABLE GUARD

Filed Sept. 9, 1942

INVENTOR.
RICHARD T. PARKER.
BY James M. Clark
ATTORNEY.

Patented Nov. 21, 1944

2,363,353

UNITED STATES PATENT OFFICE 2,363,353

CABLE GUARD

Richard Tudor Parker, San Pedro, Calif., assignor to Douglas Aircraft Company, Inc., a corporation of Delaware Application September 9, 1942, Serial No. 457,708

7 Claims. (Cl. 254—197)

This invention relates to pulleys or sheaves and more particularly to an improvement in cable guards for use in conjunction therewith.

Previous cable guards, particularly for use with pulleys in aircraft or other construction requiring cables, ropes, or like means, consisted generally of a pin fastened so as to extend across the width of the pulley. These pins were usually located at approximately the position where the cable becomes tangent to the peripheral groove of the pulley and have not proved entirely satisfactory in preventing the cable from jumping from or leaving the pulley, particularly in aircraft where vibration is appreciable. This is especially true where pieces of foreign matter collect in the groove of the pulley or are carried thereinto by the cable.

A major object of this invention is to provide an improved cable guard which positively will not allow the cable to come off the pulley. Another object is to prevent loose articles, such as bolts, screws, etc., from jamming between the cable and the pulley or between the cable and the guard.

It is a further object to provide a cable guard which is self-centering or self-positioning on the pulley, and to provide such a guard which cannot possibly impede the travel of the cable. It is also an object to produce a cable guard which is light in weight and readily adapted for quantity production in a plurality of standard sizes.

Other objects and advantages of the present invention will become apparent to those skilled in the art during the course of the following description.

In the accompanying drawing, forming a part of this specification:

Figure 1:
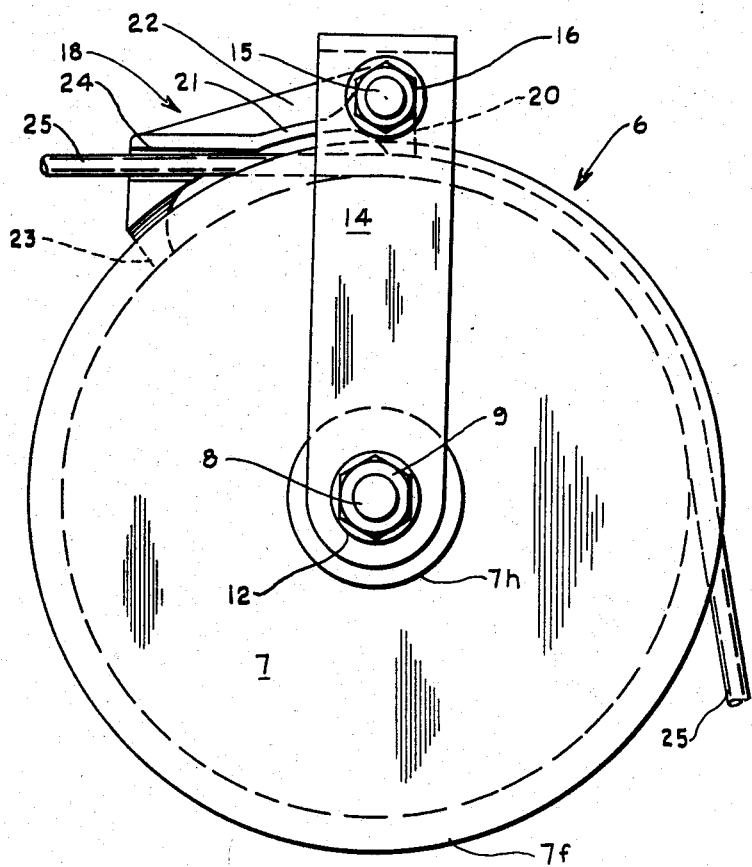
Fig. 1 is a side elevation of a pulley provided with a preferred form of my improved cable guard in position showing a cable running over the pulley and through the guard.
Figure 2:
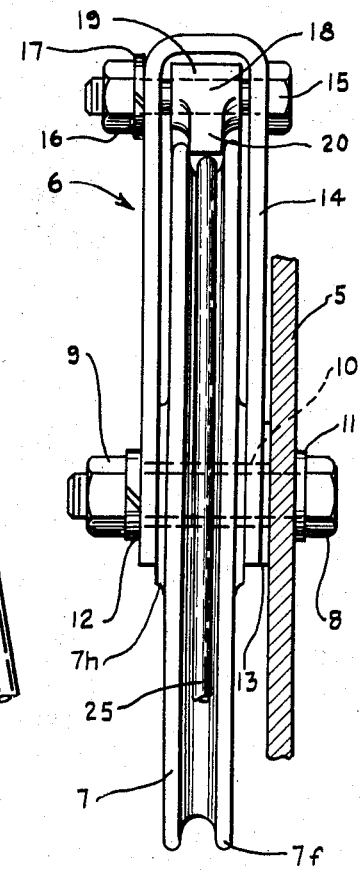
Fig. 2 is an end elevation of the pulley and guard of Fig. 1.

The support 5 may be any suitable bracket or part of the airplane or other structure to which it may be desired to attach the pulley or sheave assembly 6. The sheave or pulley 7 is rotatably supported upon the structure 5 by means of a spindle or mounting bolt 8 drawn up tight, as by means of the nut 9, against a journal bushing or sleeve 10. A washer 11 may be provided under the head of the bolt 8, as well as a lock-washer 12 under the nut 9. Another plain washer or spacer 13 is preferably provided to properly space the pulley assembly 7 and permit the free rotation of the entire assembly 6 with relation to the relatively fixed structure 5.

The sleeve 10 is preferably slightly longer than the combined widths of the yoke or guard support 14 and the spacer 13, so that the yoke 14 is free to rotate freely, both with respect to the fixed spindle 8 and the rotatable sheave 7. The yoke 14 is shown as a U-shaped strap apertured for both the spindle bushing 10 and the hinge pin 15, but it obviously could be supported from one side only of the pulley or entirely from the adjacent structure. The axes of the bores for the bushing 10 and the hinge pin 15 are preferably parallel to each other. The pulley 7 is provided with a hub 7h extending on each side, with the width between hub faces slightly less than the distance between the arms of the yoke 14 such that the pulley can rotate freely around the axis of the spindle 8, independently of the yoke or guard support 14.

The hinge pin bolt 15, which is securely fastened in place with a nut 16 and preferably locked on with a lockwasher 17, is passed through properly aligned holes on the yoke 14, and also engages a hole in the hub of the cable guard fitting 18 which is positioned between the arms of the yoke 14.

Figure 3:
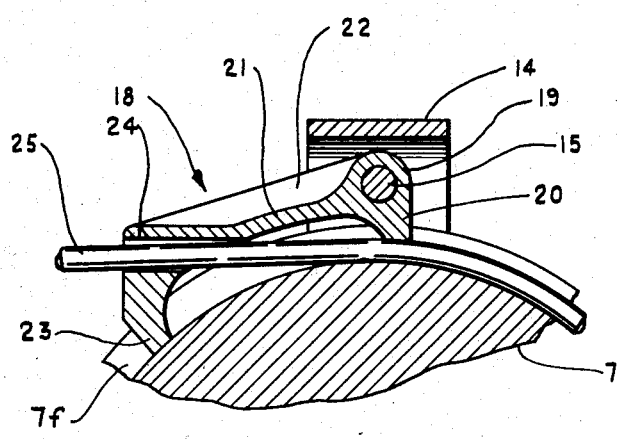
Fig. 3 is a cross sectional view taken along the line III—III of Fig. 4.
Figure 4:
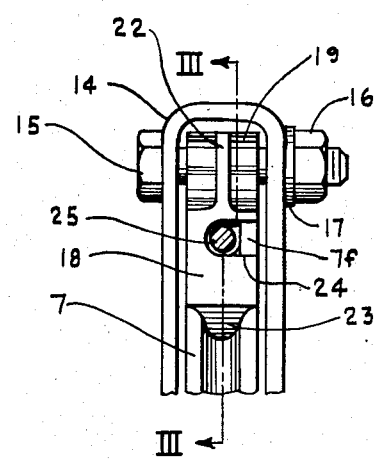
Fig. 4 is a side elevation of a portion of the pulley and guard of Fig. 1, looking at the assembly from the left.

The cable guard 18 is provided with a hub 19 through which the hole is bored or drilled for the bolt 15 about which the guard is rotatable within certain limits imposed by the cable 25 and the yoke 14. Below this hub 19, and slightly to the right, as shown in Fig. 3, there is provided a boss or lug 20, which is flat at its lower portion, and is only slightly narrower than the width of the groove between the pulley flanges 7f. The lug 20 extends down into the groove just enough to hold the cable in place but not so much as to wedge itself within the groove. Extending to the left, in Fig. 3, is the body flange 21, which is part of the arc of a circle of a diameter slightly larger than the diameter of the pulley flange 7f, so as to provide suitable clearance. To give sufficient strength to the guard fitting, a rib or web 22 is provided extending between the hub 19 and the depending boss portion 23. This boss portion 23 is contoured or shaped to fit into the groove between the pulley flanges 7f, serving to keep this groove clean and to hold the guard 18 centered on the pulley 7. Above the boss 23 is provided a guideway 24 which serves as a guide or slot for the cable 25. As may be seen in Fig. 4, this guideway is open at the side of the guard element 18 and extends thereinto slightly beyond the centerline of the pulley 7 where it terminates in a semicircular or rounded portion, such that the cable 25 is centered on the pulley 7 and can slide through it freely. The guideway 24 is cut in such a direction on the guard 18, that when the cable is threaded on the sheave assembly 6 it will lead the cable toward, or away from, the pulley 7 in the desired tangential direction, and may be open to either side of the guide fitting as desired. The width of the guard 18 is approximately the same as that of the pulley 7.

The operation of the guard will now be described by reference to Fig. 1. Assume the cable is extending from the left and is to be moved clockwise, or in the direction of the lower right after leaving the pulley. As any part of the cable 25 reaches the groove 24 the latter strips or cleans it of any dirt or foreign matter which may be on either the cable or in the pulley groove, thus eliminating jamming or fouling as previously mentioned. When such part of the cable reaches the lug 20 it is firmly held down into the groove of the pulley. The guide fitting 18 is free to rotate to a limited extent about its pivot axis, or bolt 15, due to clearances under the lugs 20 and 23, and to a much greater extent, together with the yoke 14, about the pulley axis or the bolt 8. Assuming now that for some reason the upper left hand portion of the cable in Fig. 1 is lifted from the position shown, it will first bear against the top of the guideway 24 tending to lift this end of the guard and to rotate the latter about its axis in bolt 15. Since the boss 20 at the opposite side of the fitting 18 is already in contact with the cable any further force tending to rotate the fitting in a clockwise direction will impart rotation in the same direction to the yoke 14 about the pulley axis and to the entire assembly carried thereon, until a balanced position is reached. Should the cable be lowered from the position shown each of the above movements would be reversed. Since the guard 18 is freely swingable about the axis of the pulley 7, it does not affect the direction of the cable or impede its progress.

The novel guard of the present invention can be profitably used in any pulley installation where the pulley causes a deflection of the cable beyond a few degrees. Such guards are particularly desirable on pulleys changing the direction of cables from the horizontal to the vertical. In some cases it may be desirable to use two guards for each pulley when the change in travel direction is such that the cable might have a tendency to jump out at one point when going in a first direction and at another point on its periphery when going in the reverse direction.

It is to be understood that the preferred form of the invention herewith shown and described may be varied in respect to its size, shape, and relative arrangement without in any way departing from the spirit of the invention as hereinafter more particularly defined by the appended claims.

I claim:

1. A cable guard for a rotatable sheave assembly, including a sheave having a grooved periphery, and a cable for engagement therewith, comprising a movable support member co-axially rotatable with and with respect to said sheave having a pin element movable along an arcuate path about the axis of said sheave, a cable guard fitting having an aperture engageable with said movable pin element for limited rocking movement thereabout and provided with means for separately guiding said cable, continually bearing against a further portion of said cable to maintain the same in said groove, and slidably engaging the groove of a further portion of said sheave unoccupied by said cable, said rocking movement being closely limited by the said bearing and sliding portions of said guard.

2. In a cable pulley assembly including a sheave rotatably mounted upon a fixedly supported shaft, a radially extending member pivotally mounted for rotation about said shaft with and with respect to said sheave and a cable in engagement with said sheave, a cable guard pivotally mounted upon said member for rotation both about its own axis slightly beyond the periphery of said sheave and about the axis of said sheave, said cable guard having a relatively short leg portion extending from said guard axis for inward bearing and wiping engagement against the outside of said cable, said guard having a main body portion extending substantially circumferentially from said guard axis with respect to the periphery of said sheave, said body portion being apertured to provide a guideway for said cable, the free end of said body portion having an inwardly turned boss portion adapted to engage in bearing and wiping relationship the periphery of said sheave and adapted to limit the rotation of said guard about its said pivot and thereby prevent jumping of said cable from said sheave.

3. In a cable sheave assembly including a rotatably mounted sheave having a peripheral groove and a cable in engagement therewith, a support member, a cable guard pivotally supported for limited rotation upon said support member, said cable guard being of a substantially shallow U-shape with its relatively short leg portions extending inwardly and radially with respect to said sheave periphery and its intermediate portion extending substantially co-directionally with respect to the sheave periphery between said leg portions, a corner of said guard being apertured to provide for said pivot, the remaining corner of said guard being obliquely slotted to provide a guideway for said cable and the leg portions of said guard being adapted to wipingly engage said sheave groove and the outer surface of said cable respectively.

4. A cable guard of the type described for use in preventing a cable from jumping out of the peripheral groove of a sheave, the said cable guard comprising an elongated fitting of general U-shape as viewed axially of the sheave having its free legs extending substantially inwardly and radially with respect to said sheave groove and its intermediate body portion extending substantially co-directionally with the portion of said sheave periphery intermediate said leg portions, the said guard being pivotally mounted for independent limited rotation with respect to said sheave in the region of the intersection of one of said legs and said body portion, said guard being provided with an obliquely disposed slot adapted to serve as a guideway for said cable in the region of the intersection of said second leg and said body portion, and the ends of said legs being formed such that they slidingly engage said cable and said sheave groove respectively.

5. A cable sheave assembly comprising a peripherally grooved sheave rotatably mounted upon an axially disposed support, a cable in engagement with the groove of said sheave, a radially disposed member pivotally mounted for rotation about said axial support for said sheave and a cable guard pivotally mounted upon said member upon an axis disposed beyond the peripheral groove of said sheave for rotation about said sheave axis as well as independent rotation about its own pivotal axis beyond said sheave periphery, said guard being of bifurcated form having a first terminal adjacent said pivot axis in sliding contact with the outside of said cable, its second terminal in sliding engagement with said sheave groove and an intermediate portion of said guard adjacent said second terminal apertured for the guidance of said cable.

6. A cable guard for a rotatable sheave assembly, including a sheave having a grooved periphery and a cable for engagement therewith, comprising: a support element mounted for arcuate movement concentrically with respect to said grooved sheave periphery; and a cable guard fitting pivotally mounted upon said support element for limited rocking movement with respect thereto; said cable guard fitting provided with means for separately guiding said cable, continually bearing against a further portion of said cable to maintain the same in said groove, and slidably engaging a further grooved portion of said sheave unoccupied by said cable; said rocking movements being closely limited by the said bearing and sliding portions of said guard.

7. A cable guard for a rotatable sheave assembly including a sheave having a grooved periphery and a cable for engagement therewith, comprising: a support element mounted for arcuate movement about the center of rotation of said sheave; a cable guard fitting rockably carried by said support element for limited rocking movement with respect thereto; said cable guard fitting provided with means for guiding said cable; said guard fitting having a bearing portion in contact with said cable spaced from said cable guiding means to maintain the said cable within said groove; said guard fitting having a further portion slidably engaging a portion of said sheave groove unoccupied by said cable; said rocking movements being closely limited by the said bearing and sliding portions of said cable guard fitting.

RICHARD TUDOR PARKER.